United States Patent
Macior wski et al.

(10) Patent No.: US 6,915,441 B2
(45) Date of Patent: *Jul. 5, 2005

(54) COMPUTER SYSTEM WITH MULTIPLE BACKUP MANAGEMENT PROCESSORS FOR HANDLING EMBEDDED PROCESSOR FAILURE

(75) Inventors: David R. Macior wski, Road Parker, CO (US); Michael John Erickson, Loveland, CO (US); Paul J. Mantey, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

This patent is subject to a terminal disclaimer.

(21) Appl. No.: 09/917,984

(22) Filed: Jul. 30, 2001

(65) Prior Publication Data

US 2003/0126473 A1 Jul. 3, 2003

(51) Int. Cl.[7] ............................................... G06F 1/28
(52) U.S. Cl. ..................................... 713/340; 713/300
(58) Field of Search ............................... 713/300, 310, 713/330, 340

(56) References Cited

U.S. PATENT DOCUMENTS

| 5,612,580 A | * | 3/1997 | Janonis et al. ................. 307/64 |
| 6,199,180 B1 | * | 3/2001 | Ote et al. ...................... 714/31 |
| 6,201,319 B1 | * | 3/2001 | Simonelli et al. ............. 307/26 |
| 2001/0016918 A1 | * | 8/2001 | Alexander et al. .......... 713/323 |
| 2003/0023887 A1 | * | 1/2003 | Maciorowski et al. ...... 713/300 |

* cited by examiner

*Primary Examiner*—Dennis M. Butler (57) ABSTRACT

A system for providing basic system control functions upon failure of all management processors in a computer system. During normal system operation, a plurality of management processors monitor system sensors that detect system power, temperature, and cooling fan status, and make necessary adjustments. Each management processor normally provides an output signal indicating that it is operating property. A high-availability controller monitors each of these signals to verify that there is at least one operating management processor. When none of the processors indicate that they are operating properly, the high-availability controller monitors the system sensors and updates system indicators. If a problem develops, such as failure of a power supply or a potentially dangerous increase in temperature, the high-availability controller sequentially powers down the appropriate equipment to protect the system from damage.

19 Claims, 5 Drawing Sheets

COMPUTER SYSTEM WITH MULTIPLE BACKUP MANAGEMENT PROCESSORS FOR HANDLING EMBEDDED PROCESSOR FAILURE

FIELD OF THE INVENTION

The present invention relates generally to computer systems, and more particularly, to a system comprising a plurality of backup management processors that provide basic system control functions upon failure of one or more system management processors.

BACKGROUND OF THE INVENTION

Statement of the Problem

Certain existing computer systems include a management processor to monitor and control aspects of the system environment such as power, power sequencing, temperature, and to update panel indicators. Failure of the management processor may result in system failure due to the inability to monitor and control system status, power, temperature, and the like.

Even in systems having peer or backup management processors, however, a firmware bug common to all management processors can cause the system processor to effectively become non-operational, since all of these processors are typically programmed with essentially the same code, and thus all of them are likely to succumb to the same problem when a faulty code sequence is executed.

In addition, failure of the management processor(s) may result in a destructive over-heating of the computer system cabinet due to loss of fan speed control, and the management processor failure may cause the various system power modules to power down in such a manner as to cause damage to the system electronics.

Solution to the Problem

The present system solves the above problems and achieves an advance on the field by providing a high-availability controller that monitors the status of a plurality of management processors. If all of the processors should fail, the controller provides at least a minimal set of functions required to allow the system to continue to operate reliably. Furthermore, the high-availability controller does not perform the same sequence of operations as the code executed by the management processors, and therefore is not susceptible to failure resulting from a specific 'bug' that may cause the management processors to fail.

The present system includes a power management subsystem that controls power to all system entities and provides protection for system hardware from power and environmental faults. The power management subsystem also controls front panel LEDs and provides bulk power on/off control via a power switch.

During normal system operation, a plurality of management processors monitor system sensors that detect system power, temperature, and cooling fan status. The primary management processor makes necessary adjustments or report problems. The primary management processor also updates various indicators and monitor user-initiated events such as turning power on or off.

Each management processor normally provides an output signal indicating that it is operating properly. The high-availability controller monitors each of these signals to verify that there is at least one operating management processor. When none of the processors indicate that they are operating properly, the high-availability controller monitors the system sensors and updates system indicators. If a problem develops, such as failure of a power supply or a potentially dangerous increase in temperature, the high-availability controller sequentially powers down the appropriate equipment to protect the system from damage.

In addition, if a system user decides to power down the system in the absence of a working management controller, the high-availability controller is responsive to the power switch, which can be used to initiate sequential powering down of the system power modules in such a manner as to avoid causing damage to the system electronics.

DETAILED DESCRIPTION

Figure 1:
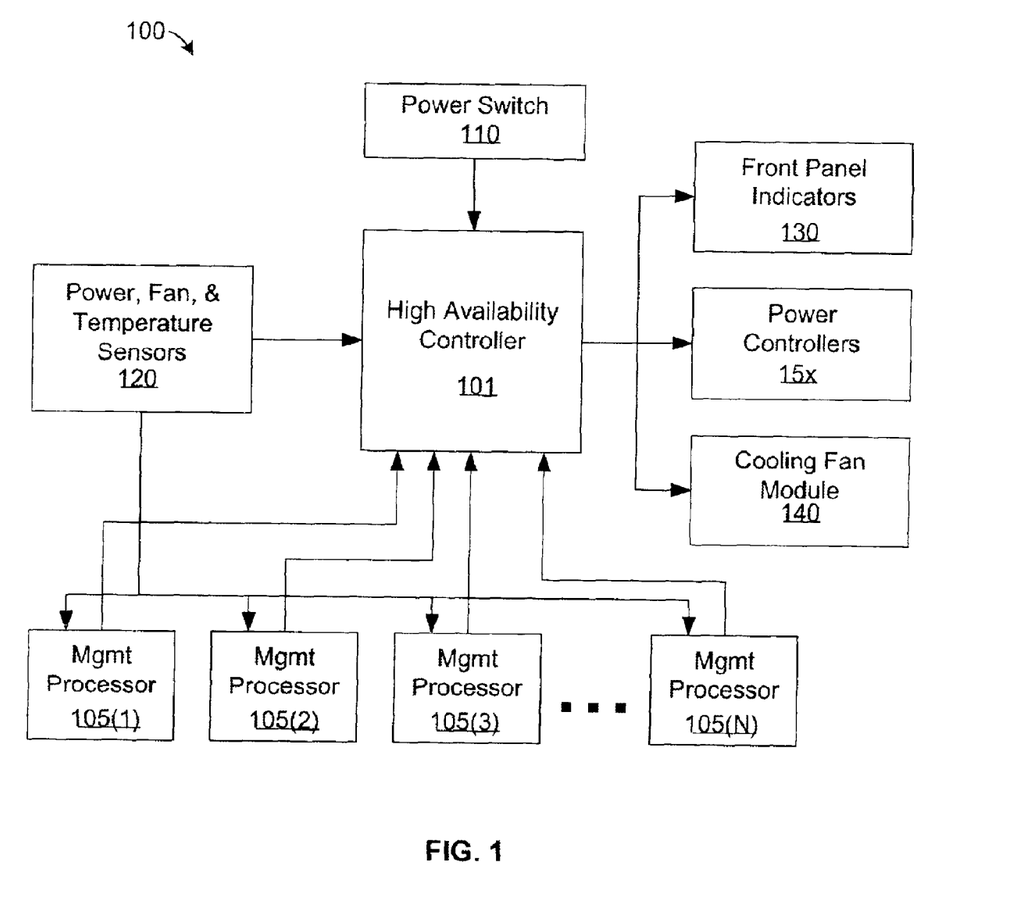
FIG. 1 is a block diagram illustrating basic components of the present system.

FIG. 1 is a block diagram illustrating basic components of the present system 100. As shown in FIG. 1, the high level components of system 100 comprise a plurality of management processors 105(1)–105(N), a high-availability controller 101, power, fan, and temperature sensors 120, front panel indicators 130, cooling fan module 140, a plurality of power controllers 150, and a power switch 110.

Each management processor 105 monitors and controls various aspects of the system environment such as power, via power controllers 15x (local power modules 151, 152, and 153, shown in FIG. 2); temperature, via cooling fans controlled by module 140; and updating panel indicators 130. Each management processor 105 also manages operations associated with core I/O board 104, which includes I/O controllers for peripheral devices, bus management, and the like. High-availability controller 101 monitors the status of each of the management processors 105, and as well as power, fan, and temperature sensors 120. In the situation wherein high-availability controller 101 detects failure of all of the management processors 105, it assumes control of the system 100, as described below in greater detail.

Since the high-availability controller does not perform the same sequence of operations as the code executed by the management processors, it is therefore not susceptible to failure resulting from a specific 'bug' that may cause the management processors to fail.

Normal System Operation

While each of the management processors 105 is operating properly, the following events take place. When the front panel power switch 110 is pressed, high-availability controller 101 recognizes this and notifies the primary management processor [hereinafter referred to by reference number 105(P)] via an interrupt. Primary management processor 105(P) evaluates the power requirements versus the available power and, if at least one system power supply is available and working properly, management processor 105 (P) commands the high-availability controller 101 to power up the system.

Figure 2:
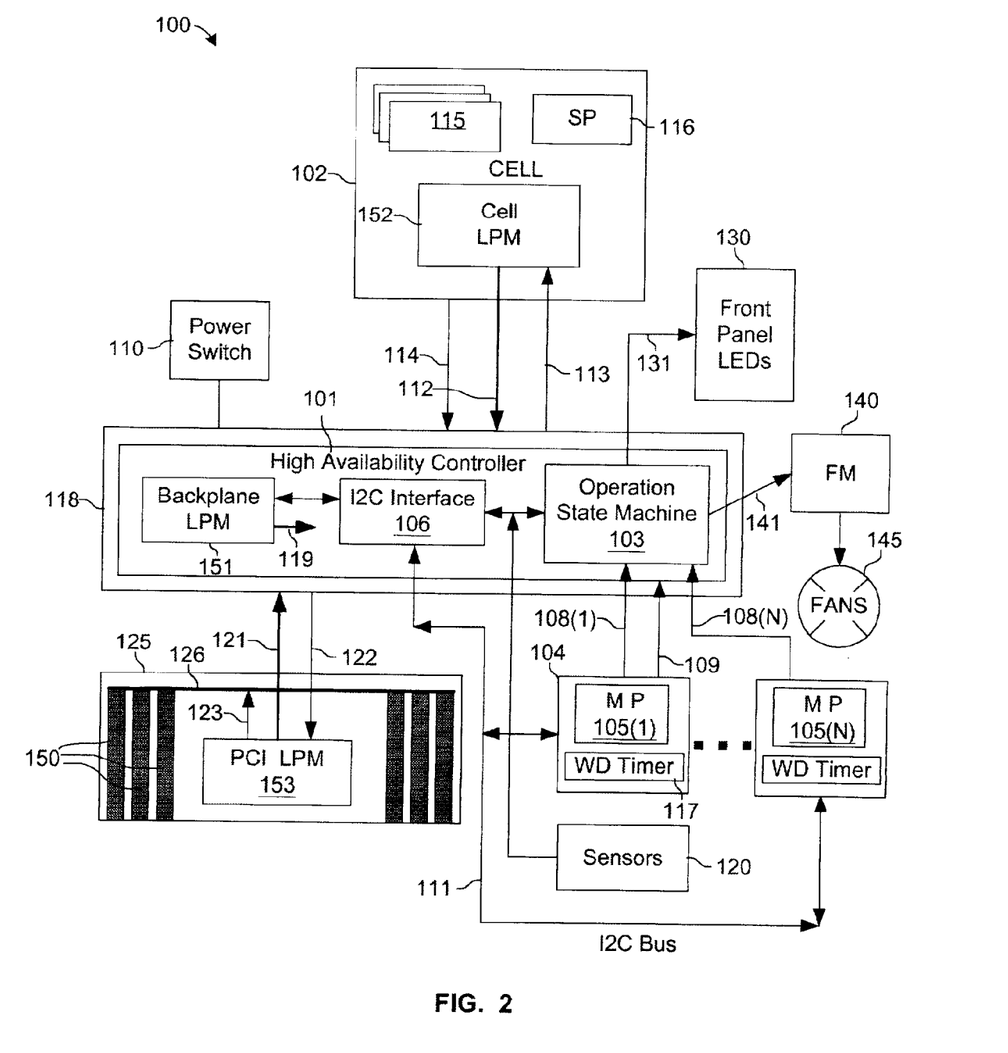
FIG. 2 is a block diagram illustrating exemplary components utilized in one embodiment of the present system.

FIG. 2 shows components utilized in an exemplary embodiment of the present system in greater detail. During normal system operation, when front panel power switch 110 is pressed, the following components are powered up in the order listed below:
(1) system backplane 118;
(2) lowest logical PCI (I/O card) backplane 125 and then associated cell board 102; and
(3) next logical PCI backplane, then associated cell board.

Note that system 100 may include a plurality of PCI backplanes 125, each of which may contain a plurality of associated cell boards 102. In the present system, a cell (board) 102 comprises a plurality of processors 115 and associated hardware/firmware and memory (not shown); a local power module 152 for controlling power to the cell; and a local service processor 116 for managing information flow between processors 115 and external entities including management processor 105.

The front panel power switch 110 controls power to system 100 in both hard- and soft-switched modes. This allows the system to be powered up and down in the absence of an operational management processor 105. When front panel power switch 110 is pressed, if no cell board 102 is present, its PCI backplane 125 is not powered up; if a cell board is present, but no PCI backplane is present, the cell board is powered up, nevertheless. When the front panel power switch is again pressed, management processor 105 is again notified by an interrupt. Management processor 105 then notifies the appropriate system entities and the system is 'gracefully' powered down in reverse order from that described above.

A Cell_Present signal 114 is routed to the system board (and to high-availability controller 101) through pins located on the connector on the cell board 102. If the cell board is unplugged from the system board, the Cell_Present signal 114 is interrupted causing it to go inactive. High-availability controller 101 monitors the Cell_Present signal and, if a Cell Power Enable signal 113 is active to a cell board 102 whose 'Cell Present' signal 114 goes inactive, the power to the board is immediately disabled and stays disabled until the power is explicitly re-enabled to the cell board. A 'Core IO Present' signal 109 is routed to the system board through pins located on the core I/O board connector. If the core I/O board 104 is unplugged, the Core 10 Present signal 109 is interrupted, causing it to go inactive.

Core I/O board 104 includes a watchdog timer 117 that monitors the responsiveness of management processor 105 to aid in determining whether the processor is operating properly. Management processor 105 includes a firmware task for checking the integrity of the system operating environment, thus providing an additional measure of proper operability of the management processor.

Operation Without a Management Processor

Figure 3:
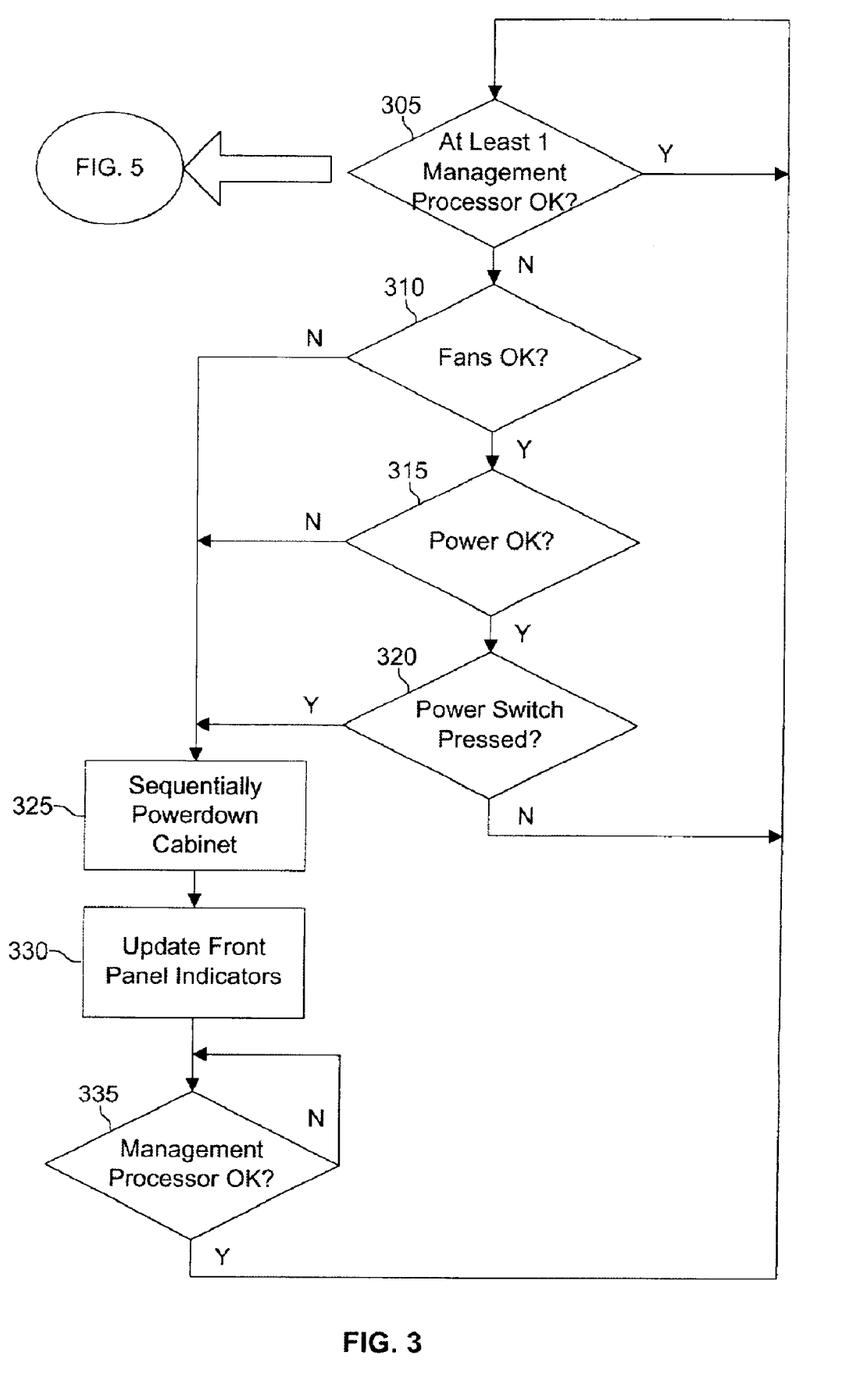
FIG. 3 is a flowchart showing an exemplary sequence of steps performed in practicing a method in accordance with the present system.
Figure 5:
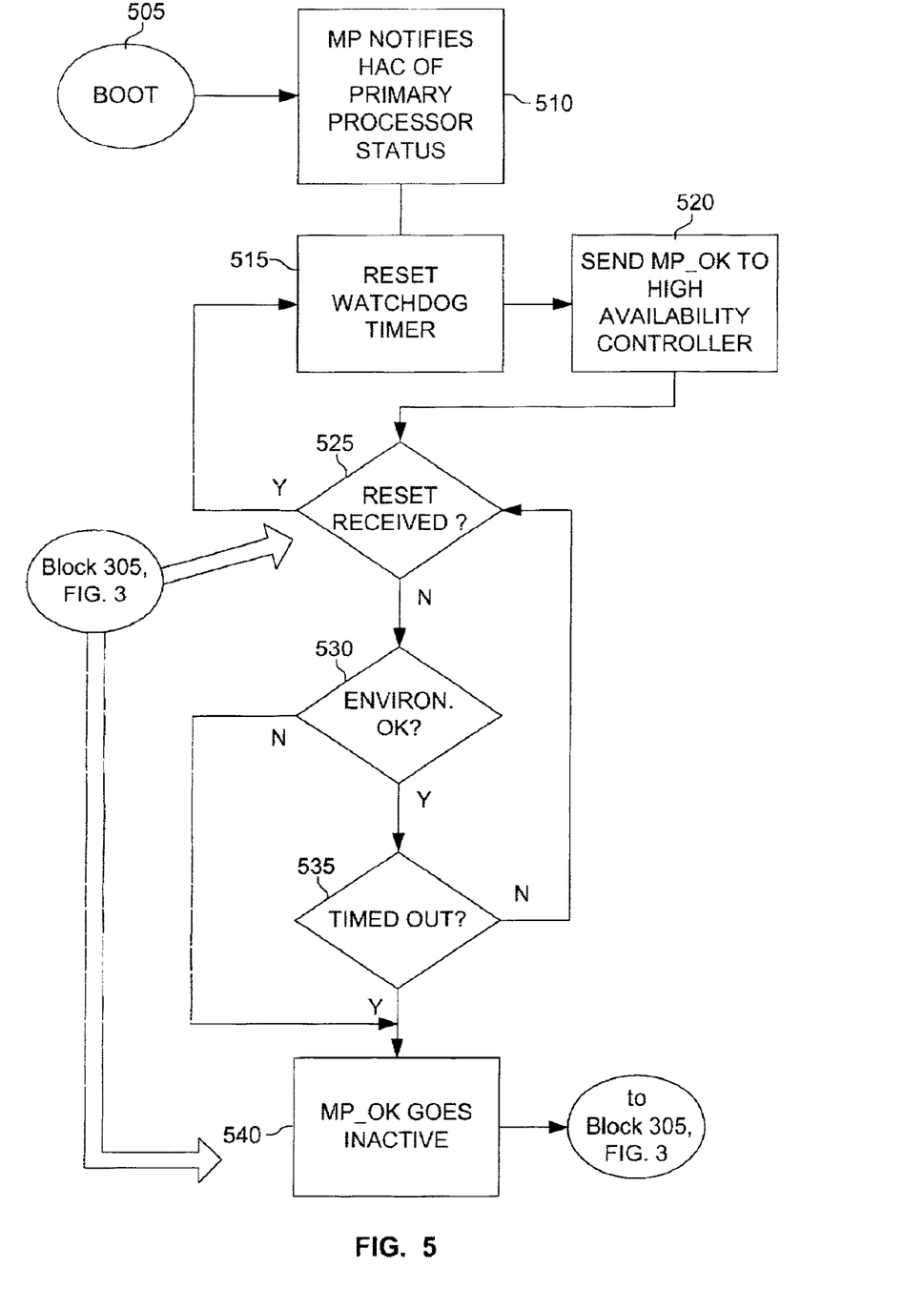
FIG. 5 is a flowchart showing an exemplary sequence of steps performed by the high-availability controller.

FIG. 3 is a flowchart showing an exemplary sequence of steps performed in practicing a method in accordance with the present system. Operation of the system may be better understood by viewing FIGS. 2 and 3 in conjunction with one another. In an exemplary embodiment of the present system, the operations described in FIG. 3 are performed by operation state machine 103. As shown in FIG. 3, at step 305, high-availability controller state machine 103 monitors the status of management processors 105 via management processor OK (MP_OK) signals 108(1)–108(N). If the MP_OK signal 108 from primary management processor 105(P) is detected as active, the management processor 105 is assumed to be operating properly, and state machine 103 continues the monitoring process, looping at step 305. If the MP_OK signal 108 from primary management processor 105(P) is detected as inactive, high-availability controller 101 checks to see whether any other of the management processors is sending a an active MP_OK signal 108. If a management processor having an active MP_OK signal 108 is found, the HAC transfers system control to the processor 105, which becomes the primary management processor 105(P). FIG. 5, described below, details the process of monitoring the management processors, as indicated by step 305 of FIG. 3.

If high-availability controller (HAC) 101 cannot detect an active MP_OK signal 108 from any of the management processors 105, the HAC assumes that management processors 105 are either not present in the system or not operational, and takes over management of system 100, at step 310, with the system in the same operational state as existed immediately prior to failure of management processor 105.

High-availability controller 101 enables the system and I/O fans 145 via fan module 140. Fan module 140 recognizes that a management processor is not operational, via an inactive SP_OK signal 141 (indicating that the management processor is not OK) from HAC 101, and sets its fan speed to an appropriate default for unmonitored operation. Should a fan fault be detected by fan module 140, high-availability controller 101 recognizes this (via a fan fault interrupt from the fan module) and powers down the system, at step 325.

The 'Cell Present' signal 114 is routed to high-availability controller 101 through pins located on the cell board connector. If the cell board is unplugged, the Cell Present signal is interrupted, causing it to go inactive. High-availability controller 101 monitors the Cell Present signal 114, and, if Cell Power Enable 113 is active to a cell board whose Cell Present signal 114 goes inactive, the power to the board is immediately disabled and will stay disabled until the power is explicitly re-enabled to the board. The Core IO Present signal 109 is routed to the HAC through pins on the core I/O board connector. If the core 10 board 104 is unplugged, the Core IO Present signal 109 is interrupted, causing it to go inactive.

The following basic signals, provided by each powerable entity (cell(s) 102, system backplane 118, and PCI backplane 125), are used by the high-availability controller (HAC) 101:
(1) a 'power enable' signal (113, 122) from the 101 (HAC) to the entity LPM;
(2) a 'device present' signal (109, 114) to the HAC;
(3) a 'device ready' signal to HAC;
(4) a 'power good' signal to the HAC; and
(5) a 'power fault' signal to the HAC (except for cell LPM fault indications, which are provided to the local service processor 116 for the cell). For the sake of clarity, each of the latter three signals [(3)–(5)] is combined into a single line in FIG. 2, as shown by lines 112, 119, and 121, for cell 102, system backplane 118, and PCI backplane 125, respectively.

At step 310, if a fan fault is detected by fan module 140, operation state machine 103 recognizes this (via a fan fault interrupt from the fan module) and sequentially powers down the system, at step 325, described below. Otherwise, at step 315, if a power fault interrupt is received by high-availability controller 101 when the 'Device_N_Power_Good' signal (410 in FIG. 4) goes inactive, operation state machine 103 sequentially powers down the system, at step 325, below.

If, at step 315, system power is determined to be OK, i.e., if a 'backplane power good' signal 119 is detected, then at step 320, state machine 103 checks to see whether the system (front panel) power switch 110 is pressed. If not, state machine 103 resumes system monitoring at step 305. If the power switch has been pressed, then at step 325, state machine 103 causes system 100 to be sequentially powered down in the sequence listed below.

(1) last logical PCI (I/O card) backplane 125, then associated cell board 102;
(2) highest logical PCI backplane 125 and then associated cell board 102; and, finally,
(3) system backplane 118.

At step 330, front panel indicators 130 are updated, and finally, at step 335, high-availability controller 101 monitors the management processor OK signals 108(1)–108(N) to determine whether any management processor 105 is again operational. When it is determined that at least one management processor 105 is operational, control is passed to that processor, and high-availability controller operational state machine 103 resumes its status monitoring function at step 300.

High-Availability Controller Logic

Figure 4:
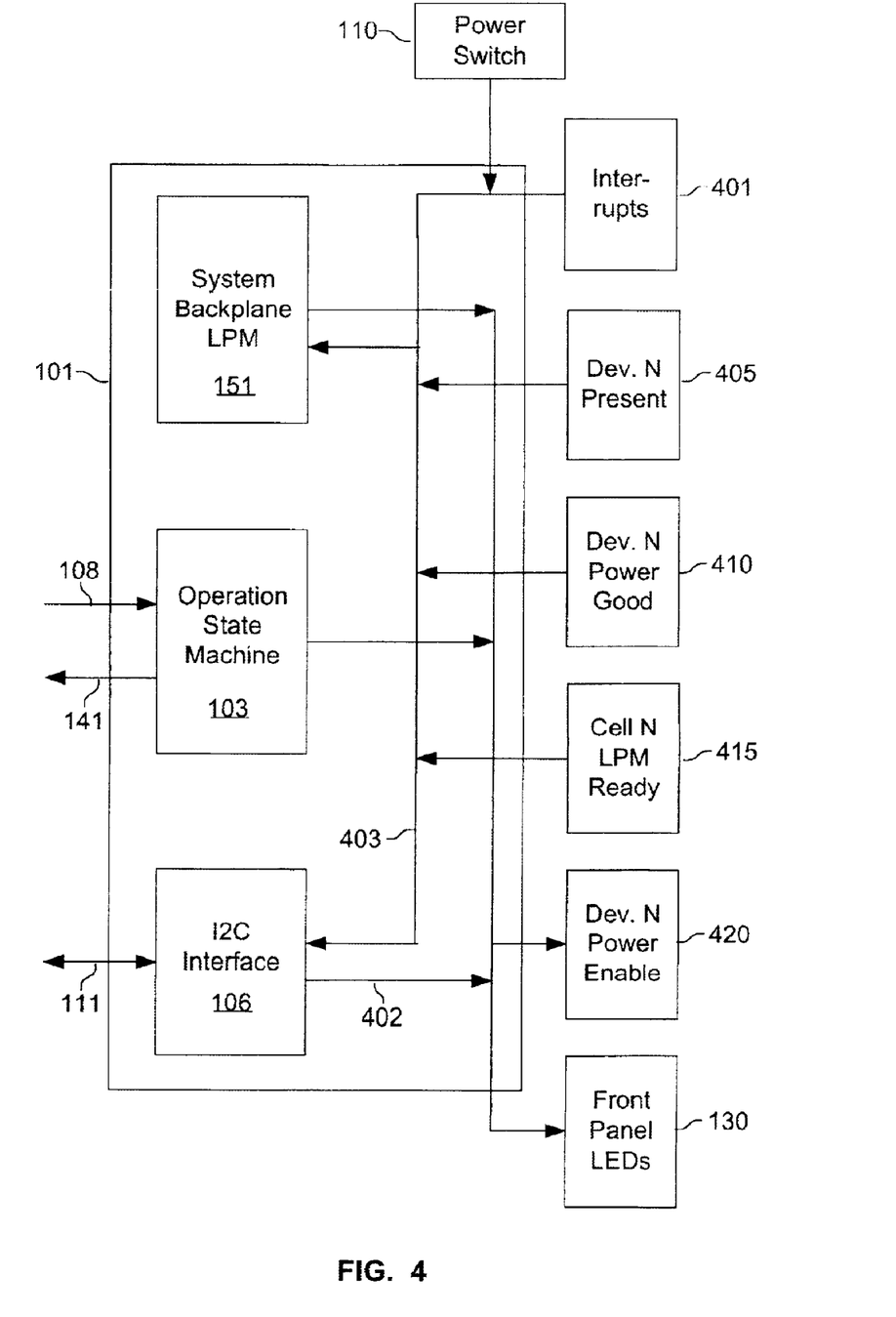
FIG. 4 is a block diagram illustrating, in greater detail, the high-availability controller of the present system.

FIG. 4 is a block diagram illustrating, in greater detail, the high-availability controller of the present system. As shown in FIG. 4, high-availability controller (HAC) 101 centralizes control and status information for access by management processors 105. In an exemplary embodiment of the present system, high-availability controller 101 is implemented as a Field Programmable Gate Array (FPGA), although other non-software coded device could, alternatively, be employed. In any event, HAC 101 does not perform the same sequence of operations as the code executed by management processors 105.

The following sensor and control signals are either received or generated by the HAC while monitoring the operation of system 100:

(1) Front panel power switch 110 is monitored by high-availability controller 101.
(2) Fan fault signals report fan problems detected by fan module 140. Fan faults, as well as backplane power faults, are reported via interrupt bus 401, except for cell boards 102, from which fan fault signals are sent to the corresponding local service processor 116).
(3) A 'device present' signal 405 is sent from each major board, i.e., cell 102, I/O backplane 125, and core 10/management processors 104 (as well as front panel & mass storage boards [not shown]) in the system indicating that the board has been properly inserted into the system.
(4) 'Power Enable' signals 420 are sent to each LPM 15x to control the power of each associated powerable entity. 'Power good' status, via signals 410 from the main power supplies and the powerable entities, confirms proper power up and power down for each entity.
(5) An 'LPM Ready' signal 415 comes from each board in the system. This signal indicates that the specific LPM 15x has been properly reset, all necessary resources are present, and the LPM is ready to power up the associated board.
(6) Front panel indicators (LEDs or other display devices) 130 of main power, standby power, management processor OK, and other indicators controlled by the operating system, are controllable by high-availability controller 101.

The buses indicated by lines 402 and 403 are internal to the high-availability controller FPGA, and function as 'data out' and 'data in' lines, respectively. In an exemplary embodiment of the present system, block 106 is an I2C bus interface that provides a remote interface between management processors 105 and the sensors and controls described above.

High-Availability Controller Operation State Machine

FIG. 5 is a flowchart showing an exemplary sequence of steps performed by the high-availability controller operation state machine 103. As shown in FIG. 5, after a system boot operation at step 505, wherein all management processors 105(1)–105(N) initiate execution of their respective operating systems, at step 510, the management processor 105 that has been designated as the default primary management processor 105(P) notifies high-availability controller 101 of its primary processor status. High-availability controller 101 then enables management processor 105(P) so that it controls all system functions for which the management processor is responsible, including the monitoring and control functions described above, via I2C bus 111. All management processors 105 receive inputs from power, fan, and temperature sensors 120 (via I2C bus 111), but only primary management processor 105(P) controls the related system functions.

At step 515, all management processors 105 (1)–105(N) start (reset) their watchdog timers 117. In the present exemplary embodiment, each watchdog timer 117 has a user-adjustable timeout period of between approximately 6 and 10 seconds, but other timer values may be selected, as appropriate for a particular system 100. At step 520, management processor OK (MP_OK) signal 108, which is held in an active state as long as watchdog timer 117 is running, is sent to high-availability controller 101. When a given management processor 105 is functioning properly, it periodically sends a reset signal to watchdog timer 117 to cause the timer to restart the timeout period. If a particular management processor 105 malfunctions, it is likely that the processor will not reset the watchdog timer, which will then time out, causing the MP_OK signal 108 to go inactive. When high-availability controller 101 detects an inactive MP_OK signal, the controller takes over control of system 100, as described with respect to step 310 in FIG. 3, above.

At step 525, if a watchdog timer reset signal has been sent from primary management processor 105(P), then the timer is reset, at step 515. Otherwise, at step 530, management processor 105(P) checks the status of the system environment. Each management processor 105 includes a firmware task that compares system power, temperature, and fan speed with predetermined values to check the integrity of the system operating environment. If the system environmental parameters are not within an acceptable range, then management processor 105(P) does not reset the watchdog timer 117, which causes MP_OK signal 108 to go inactive, at step 540. Operational state machine 103 will then check to see whether any other management processors are operational, as described above, at step 305 in FIG. 3. If the system environmental parameters are within an acceptable range, then at step 535, if watchdog timer 117 has not timed out, management processor 105(P) loops back to step 525.

While preferred embodiments of the present invention have been shown in the drawings and described above, it will be apparent to one skilled in the art that various embodiments of the present invention are possible. For example, the specific configuration of the system as shown in FIGS. 1, 2, and 4, as well as the particular sequence of steps described above in FIGS. 3 and 5, should not be construed as limited to the specific embodiments described That is claimed is:

1. A multiple redundancy backup management system for providing basic system functions in a computer system, comprising:
    a plurality of system sensors for detecting power, temperature, and cooling fan speed in the computer system;
    a plurality of management processors, wherein each of the processors is coupled to each of said sensors;
    wherein a management processor status signal is generated by each of said management processors to indicate an operational state thereof;
    a high-availability controller, operably coupled to said status signal and to said sensors;
    wherein said high availability controller comprises a non-software coded state machine that performs a different sequence of operations than the code executed by said management processors.
    wherein said sensors include:
        a plurality of power controllers, each of which monitors the state of an associated power supply in the computer system, and controls power thereto; and
        at least one cooling fan controller for detecting and controlling said cooling fan speed; and
    wherein, in response to detecting inactive processor status signals from all said management processors, said high availability controller generates control signals in response to outputs from said sensors to control operation of said power controllers and said fan controller.

2. The backup management system of claim 1, wherein said state machine is a field programmable gate array.

3. The backup management system of claim 1, wherein, in response to detecting inactive processor status signals from all said management processors, if a fan fault is detected or if a backplane power good signal is not detected, said high-availability controller sequentially powers down the system.

4. The backup management system of claim 3, wherein the computer system includes at least one I/O card backplane and a system backplane, and said high-availability controller powers down the system sequentially, in the following order:
    last logical said I/O card backplane, then associated said cell board;
    highest logical said I/O card backplane, then associated said cell board; and
    said system backplane.

5. The backup management system of claim 4, wherein, in response to detecting inactive processor status signals from all said management processors, if said high-availability controller detects that the power switch was pressed, said high-availability controller powers down the system sequentially.

6. The backup management system of claim 1, further including a power switch, for controlling bulk power to the computer system, coupled to said management processors and said high availability controller;
    wherein said high-availability controller is responsive to an output from the power switch to initiate powering down of each said power supply when the management processors have failed.

7. The backup management system of claim 1, wherein each of said management processors includes a watchdog timer that sets its said processor status signal to an inactive state when the respective management processor does not reset the timer within a predetermined period of time.

8. A method for multiple redundancy backup management of basic system functions in a computer system, the method comprising the steps of:
    monitoring, via a plurality of management processor, a plurality of sensors for detecting power, temperature, and cooling fan speed in the computer system;
    generating a plurality of processor status signals, each signal indicating an operational state of an associated one of said management processors;
    monitoring said plurality of processor status signals; and
    generating, in response to detecting that all of said processor status signals are inactive, backup control signals, in response to outputs from said sensors, to control system devices monitored by said plurality of sensors;
    wherein said backup control signals are generated by a non-software coded state machine, operably coupled to said management processors, and sensors, and controllers.

9. The method of claim 8, wherein said state machine performs a different sequence of operations than the code executed by said management processor.

10. The method of claim 8, wherein said sensors include at least one cooling fan controller for detecting and controlling cooling fan speed, and a plurality of power controllers, each of which monitors the state of, and controls power to, an associated power supply in the computer system, including the step of:
    sending said control signals and said backup control signals to said power controllers and to said cooling fan controller.

11. The method of claim 8, including the step of setting, for each of said management processors, a watchdog timer that generates an inactive said processor status signal for the associated one of said management processors when the management processor does not reset the timer within a predetermined period of time.

12. The method of claim 8, including the step of sequentially powering down the system in response to detecting inactive processor status signals from all said management processors, if a fan fault is detected or if a backplane power good signal is not detected.

13. The method of claim 12, wherein the computer system includes at least one I/O card backplane and a system backplane, and wherein the step of powering down the system sequentially comprises the following steps in the following order:
    powering down the last logical said I/O card backplane, then associated said cell board; and
    powering down the highest logical said I/O card backplane, then associated said cell board; and
    powering down said system backplane.

14. A backup management system for providing basic system control functions in a computer system comprising:
    a plurality of system sensors for detecting signals from at least two devices in the group of devices consisting of a power module for monitoring the state of an associated power supply in the computer system, a temperature sensor for monitoring temperature in the computer system, and a cooling fan speed module for detecting and controlling system cooling fan speed;
    a plurality of management processors, wherein each of the processors is coupled to each of said sensors;

wherein a management processor status signal is generated by each of said management processors to indicate an operational state thereof;

a non-software coded state machine, operably coupled to each of said management processors and to said system sensors, wherein said state machine performs a different sequence of operations than the code executed by said management processors;

wherein, in response to detecting that each said status signal is inactive, said state machine generates control signals to said power module and to said fan module in response to outputs from said system sensors to control the operation thereof.

15. The backup management system of claim 14, including:

a plurality of power controllers, each of which monitors the state of an associated power supply in the computer system, and controls power thereto, and at least one cooling fan controller for detecting and controlling said cooling fan speed.

16. The backup management system of claim 14, wherein each said management processor includes a watchdog timer that sets said processor status signal for the associated processor to an inactive state when the management processor does not reset the timer within a predetermined period of time.

17. The backup management system of claim 14, wherein, in response to detecting inactive processor status signals from all said management processors, if a fan fault is detected or if a backplane power good signal is not detected, a high-availability controller sequentially powers down the system.

18. The backup management system of claim 17, wherein the computer system includes at least one I/O card backplane and a system backplane, and said high-availability controller powers down the system sequentially, in the following order:

last logical said I/O card backplane, then associated said cell board;

highest logical said I/O card backplane, then associated said cell board; and said system backplane.

19. The backup management system of claim 18, wherein, in response to detecting inactive processor status signals from all said management processors, if said high-availability controller detects that the power switch was pressed, said high-availability controller powers down the system sequentially.

* * * * *

UNITED STATES PATENT AND TRADEMARK OFFICE
CERTIFICATE OF CORRECTION

PATENT NO.         : 6,915,441 B2
APPLICATION NO.    : 09/917984
DATED              : July 5, 2005
INVENTOR(S)        : David R. Macior wski et al.

It is certified that error appears in the above-identified patent and that said Letters Patent is hereby corrected as shown below:

On the Title Page, Item (57), under "Abstract", line 7, delete "property" and insert -- properly --, therefor.

In column 3, line 47, delete "10" and insert -- IO --, therefor.

In column 4, line 41, delete "10" and insert -- IO --, therefor.

In column 5, line 48, delete "10" and insert -- IO --, therefor.

In column 7, line 22, in Claim 1, delete "processors." and insert -- processor; --, therefor.

In column 8, line 7, in Claim 8, delete "processor," and insert -- processors, --, therefor.

In column 8, line 22, in Claim 8, before "sensors," delete "and" and insert -- said --, therefor.

In column 9, line 19, in Claim 15, delete "thereto," and insert -- thereto; --, therefor.

Signed and Sealed this

Fourth Day of August, 2009

JOHN DOLL
*Acting Director of the United States Patent and Trademark Office*